United States Patent
Asai et al.

(10) Patent No.: US 11,383,648 B2
(45) Date of Patent: Jul. 12, 2022

(54) SHIELDING MEMBER

(71) Applicants: HAYASHI TELEMPU CORPORATION, Nagoya (JP); NIFCO INC., Yokosuka (JP)

(72) Inventors: Hiroaki Asai, Nagoya (JP); Atsuko Inukai, Nagoya (JP); Jun Fujimatsu, Nagoya (JP); Yuto Aoki, Yokosuka (JP)

(73) Assignees: HAYASHI TELEMPU CORPORATION, Nagoya (JP); NIFCO INC., Yokosuka (JP)

( * ) Notice: Subject to any disclaimer, the term of this patent is extended or adjusted under 35 U.S.C. 154(b) by 0 days.

(21) Appl. No.: 16/953,280

(22) Filed: Nov. 19, 2020

(65) Prior Publication Data

US 2021/0146843 A1   May 20, 2021

(30) Foreign Application Priority Data

Nov. 20, 2019   (JP) .............................. JP2019-209833

(51) Int. Cl.
*B60R 5/04*   (2006.01)

(52) U.S. Cl.
CPC .................................... *B60R 5/045* (2013.01)

(58) Field of Classification Search
CPC ................................. B60R 5/045; B60J 11/08
USPC ............................................ 296/37.16, 136.13
See application file for complete search history.

(56) References Cited

U.S. PATENT DOCUMENTS

| | | | | |
|---|---|---|---|---|
| 6,155,329 A | * | 12/2000 | Hwang | B60J 1/2091 160/329 |
| 9,387,807 B2 | * | 7/2016 | Horst | B60R 5/044 |
| 2004/0227373 A1 | * | 11/2004 | Robbins | B60J 11/08 296/95.1 |

FOREIGN PATENT DOCUMENTS

| | | | |
|---|---|---|---|
| JP | 3291647 B2 | * | 6/2002 |
| JP | 2003-211958 A | | 7/2003 |
| JP | 5456570 B2 | | 4/2014 |
| JP | 6193560 B2 | | 9/2017 |
| WO | WO-2018/186266 A1 | | 10/2018 |

* cited by examiner

*Primary Examiner* — Joseph D. Pape
(74) *Attorney, Agent, or Firm* — Foley & Lardner LLP

(57) ABSTRACT

A shielding member comprises a generally rectangular and flexible sheet member including a first part and a second part, a first wire surrounding at least a portion of the first part, and a second wire surrounding at least a portion of the second part. The shielding member is foldable in two about a portion between the first wire and the second wire such that the first part with the first wire and the second part with the second wire overlap each other.

3 Claims, 6 Drawing Sheets

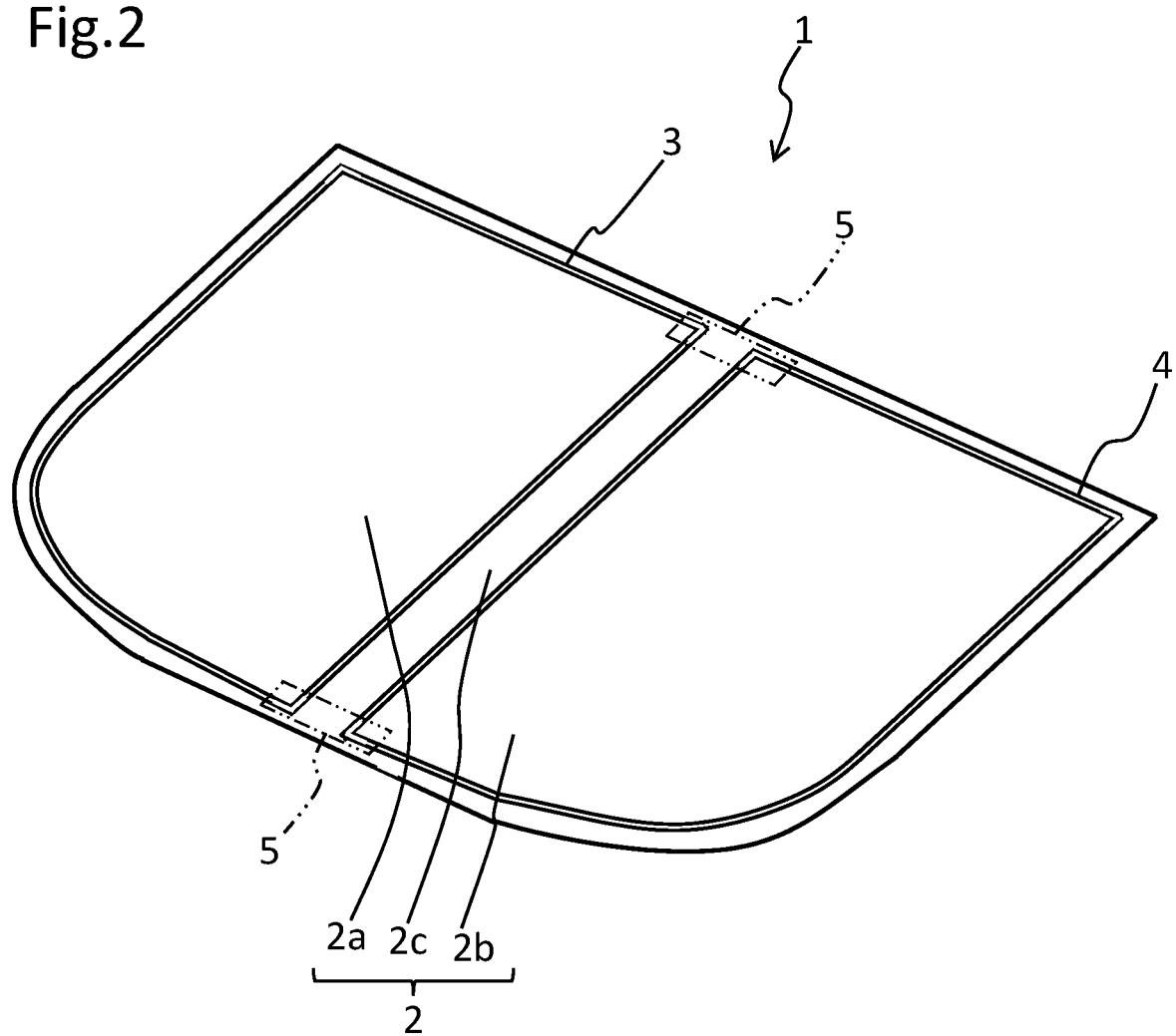

SHIELDING MEMBER

This application is based upon and claims the benefit of priority to Japanese Patent Application No. 2019-209833, filed Nov. 20, 2019, the entire contents of which are incorporated herein by reference.

FIELD OF THE INVENTION

The present invention relates to a shielding member.

BACKGROUND OF THE INVENTION

In the vehicle in which the luggage compartment is provided in the rear, in order to prevent the interior of the luggage compartment from being seen from the outside of the vehicle, a sheet-shaped shielding member which is referred to as a tonneau cover may be provided above the luggage compartment. The tonneau cover covers the upper part of the luggage compartment when a piece of luggage is placed in the luggage compartment. For example, if the tonneau cover is connected to the back door with a string, the rear of the tonneau cover can be raised and lowered in conjunction with the opening and closing of the back door, so that the user's accessibility when transferring a luggage into and from the luggage compartment, is improved. Therefore, it is easy to transfer a piece of luggage into and from the luggage compartment. However, when a tall piece of luggage is transferred into the luggage compartment, it is necessary to remove the tonneau cover to open the upper space of the luggage compartment. Further, when the piece of luggage is not placed in the luggage compartment, it is unnecessary to cover the luggage compartment with the tonneau cover, and therefore the tonneau cover may be removed. As described above, in the case of placing a tall piece of luggage in the luggage compartment, or in the case of not placing any luggage in the luggage compartment, or in the case of folding the seat forward to make a full flat surface together with the upper surface of the luggage compartment which allows, for example, an occupant to lie down, it is desirable to remove the tonneau cover. Therefore, the tonneau cover is preferably attachable and detachable above the luggage compartment. Typically, the tonneau cover which was removed from the luggage compartment is folded and stored so as not to become an obstacle.

The foldable shade for the automobile described in Patent Document 1: JP2003-211958A has a hinge structure in which a hinge pin passes through hinge pieces which are provided to two sheets respectively. The tonneau cover described in Patent Document 2: JP5456570B has a structure in which a cut line is formed in a part of a board and the board can be folded at the part where the cut line is formed. The tonneau cover described in Patent Document 3: JP6193560B and Patent Document 4: WO2018/186266A can be folded in three or more sections.

In the shade for the automobile described in Patent Document 1, the hinge structure composed of hinge pieces of two sheets and a hinge pin, protrudes in the thickness direction of the sheet. Thus, space for the hinge structure is required. In addition, the hinge structure exposed in the folded state impairs the design.

In the tonneau cover described in Patent Document 2, a cut line is formed in the board and the board is connected only by the connecting portion. Therefore, if the folding and unfolding operations are repeatedly performed in long-term use, the connecting portion may be damaged. That is, the durability of this tonneau cover is inferior.

The tonneau covers described in Patent Documents 3 and 4 can be folded so that it becomes small. However, the problem arises that the folding method is complicated and difficult to understand, and therefore, it is difficult to fold the tonneau cover. In addition, the appearance of the tonneau cover in the folded state may not look good.

As mentioned above, in each of the structures described in Patent Documents 1 to 4, it is not possible to satisfy all of the requirements that include ease of folding, durability and the design, that is, to achieve a good appearance.

It is therefore an object of the present invention to provide a shielding member which can be easily folded and which can have both good durability and good design.

SUMMARY OF THE INVENTION

A shielding member comprises a generally rectangular and flexible sheet member including a first part and a second part, a first wire surrounding at least a portion of the first part, and a second wire surrounding at least a portion of the second part, wherein the shielding member is foldable in two about a portion between the first wire and the second wire such that the first part with the first wire and the second part with the second wire overlap each other.

The shielding member of the present invention can be easily folded and can have both good durability and good design.

BRIEF DESCRIPTION OF THE DRAWINGS

FIG. 2 is a schematic view schematically showing the positional relationship between the first and second wires and the sheet member and the hinge mechanism of the tonneau cover shown in FIGS. 1A and 1B.

DETAILED DESCRIPTION OF THE INVENTION

Embodiments of the present invention will be described below.

Figure 1A:
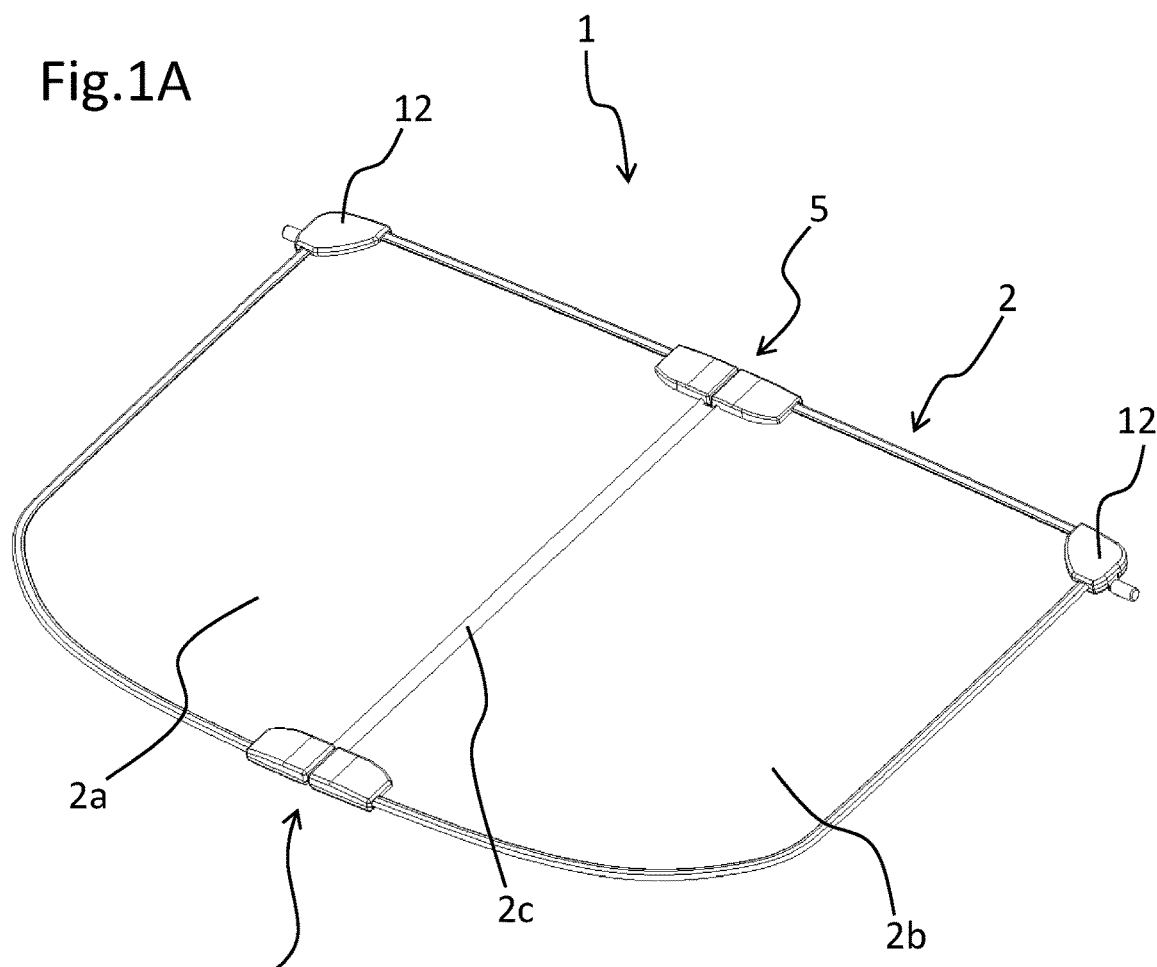
FIG. 1A is a perspective view of a tonneau cover, which is one example of a shielding member of the present invention, in an opened state.
Figure 1B:
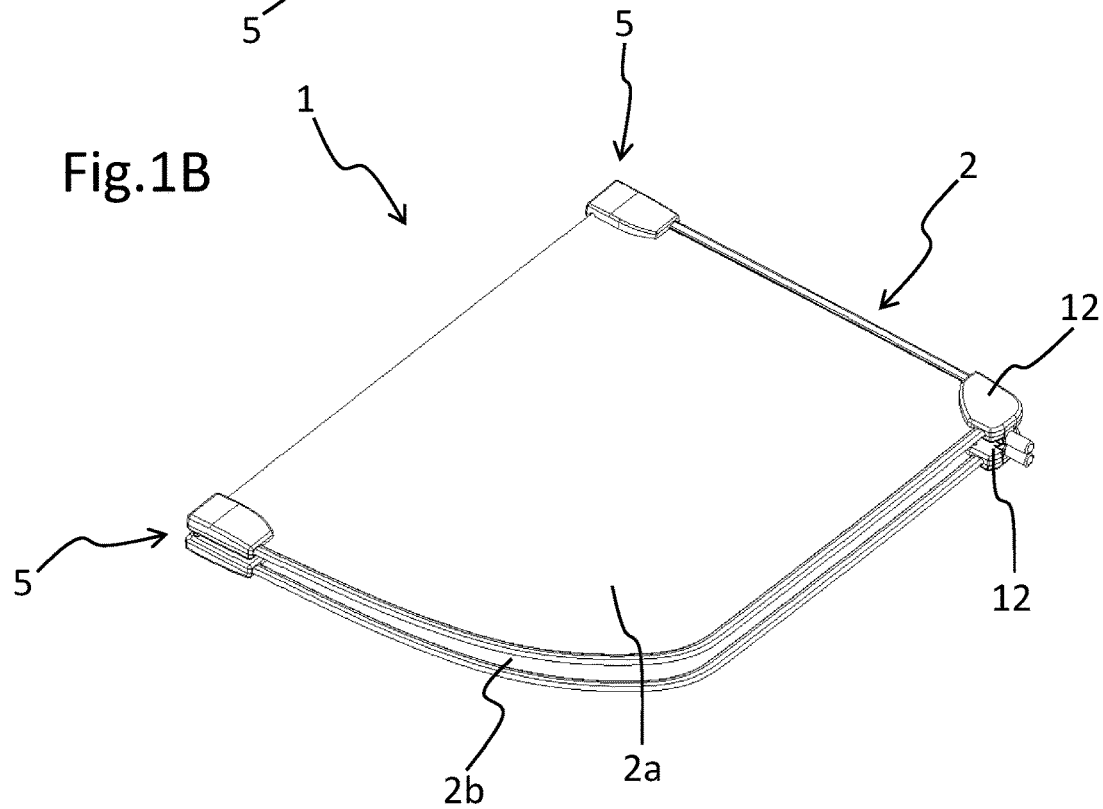
FIG. 1B is a perspective view of a tonneau cover, which is one example of a shielding member of the present invention, in a closed state.

Tonneau cover 1 which is an embodiment of a shielding member of the present invention is shown in FIGS. 1A, 1B. Tonneau cover 1 in the opened state shown in FIG. 1A, can cover the luggage compartment of a vehicle (not shown). Tonneau cover 1 can be removed from above the luggage compartment and folded in two as shown in the FIG. 1B. Thereby, tonneau cover 1 can be folded and stored in a state in which the luggage compartment is opened to the outside.

Tonneau cover 1 has sheet member 2 made of synthetic resin, and first and second wires 3 and 4 made of metal. Sheet member 2 is a flexible thin sheet having a substantially rectangular outer shape. Sheet member 2 has first part 2a, second part 2b and part 2c therebetween. First wire 3 and second wire 4 have substantially the same shape, which is a closed loop shape having a substantially rectangular outer shape. First wire 3 surrounds first part 2a of sheet member 2, and second wire 4 surrounds second part 2b. Part 2c between first wire 3 and second wire 4 of sheet member 2 connects first part 2a and second part 2b. Sheet member 2 is continuously provided over first part 2a and second part 2b. In the illustrated embodiment, first wire 3 surrounds the whole of first part 2a, and second wire 4 surrounds the whole of second part 2b. However, it is not necessary to limit the present invention to such a structure. First wire 3 may surround at least a portion of first part 2a. That is, first wire 3 may not have a closed loop shape, but may have a shape in which a part thereof is divided and is not continuous. A portion of first part 2a may not be surrounded by first wire 3. Similarly, second wire 4 may surround at least a portion of second part 2b. Second wire 4 may not have a closed loop shape, but may have a shape in which a part thereof is divided and is not continuous. A portion of second part 2b may not be surrounded by second wire 4.

Such a structure is achieved by arranging sheet member 2 so as to cover first wire 3 and second wire 4 after arranging first wire 3 and second wire 4 side by side in a line-symmetrical positional relationship in a plan view, as schematically shown in FIG. 2. In other words, a portion surrounded by first wire 3, a portion surrounded by second wire 4, and a portion located between first wire 3 and second wire 4 are collectively covered by continuous sheet member 2.

First wire 3 and second wire 4 are connected by hinge mechanisms 5 schematically shown in FIG. 2. In the present embodiment, two sheet members 2 are disposed so as to face each other with first and second wires 3 and 4 interposed therebetween. Therefore, sheet members 2 are visible from either side of tonneau cover 1, and first and second wires 3 and 4 are invisible. Design property can be improved by sheet members 2, and members such as first and second wires 3 and 4 do not impair the design property. Hinge mechanisms 5 are disposed only at both ends of the sides, that face each other, of first wire 3 and second wire 4. Hinge mechanisms 5 are only provided in a very small portion in entire tonneau cover 1. Therefore, hinge mechanisms 5 of the present embodiment hardly affect the design property of tonneau cover 1.

When folding tonneau cover 1, as shown in FIG. 1B, sheet member 2 is folded in two around part 2c between first wire 3 and second wire 4. First wire 3 and second wire 4 are not bent. Tonneau cover 1 is folded by bending parts 2c between first and second wires 3 and 4 of sheet members 2, which are not fixed to first and second wires 3 and 4. Hard first and second wires 3 and 4 are not bent, and only flexible thin sheet members 2 are bent. Therefore, the position to be folded is easily and intuitively understood by the user, and tonneau cover 1 is folded smoothly and easily. Since thin sheet member 2 has low rigidity and is flexible, thin sheet member 2 is not likely to be damaged even after being repeatedly folded and expanded. Therefore, its durability is good. Hinge mechanism 5 may have any structure as long as it is connected to first and second wires 3 and 4, respectively, and holds first and second wires 3 and 4 at an interval from each other, and as long as it does not inhibit bending part 2c between first and second wires 3 and 4.

Figure 3:
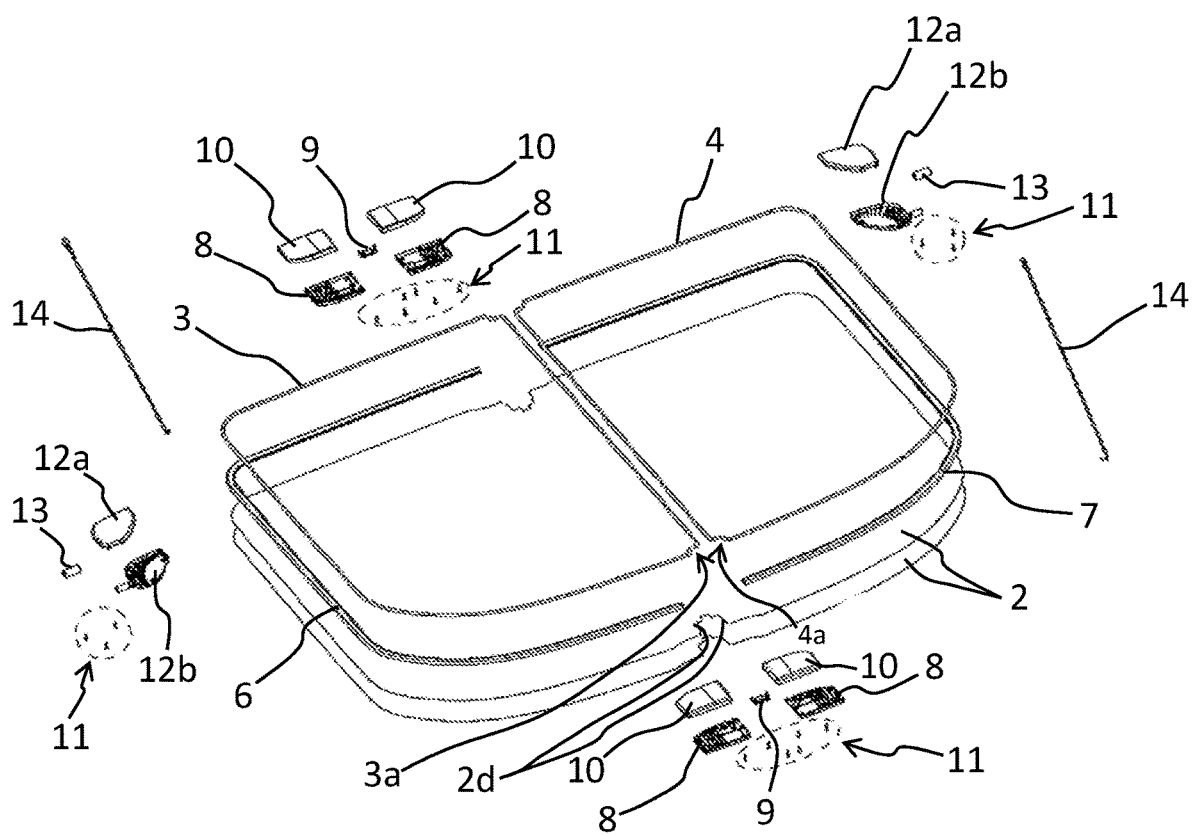
FIG. 3 is an exploded view of the tonneau cover shown in FIGS. 1A and 1B.

A more detailed embodiment of tonneau cover which is an example of the abovementioned shielding member of the present invention, will be described below. As shown in FIG. 3, in tonneau cover 1 of the present embodiment, first and second wires 3 and 4 that are made of metal and flexible edging portions 6, 7 that are made of a synthetic resin are disposed on two sheet members 2 which overlap with each other. Edging portions 6, 7 cover parts of first and second wires 3 and 4. Sheet member 2 is made of a so-called jersey fabric. Edging portions 6,7 are made of synthetic leather (e.g., soft leather C mat). Edging portions 6, 7 are not provided at positions which are in contact with the sides, that face each other, of first wire 3 and second wire 4, but, in other portions, edging portions 6, 7 cover first and second wires 3 and 4.

First and second wires 3 and 4 are weldable wires having a circular shape in a cross section, such as brass wire or hard steel wire or piano wire, mainly made of iron or brass. First and second wires 3 and 4 preferably have an elastic modulus between $0.98 \times 10^5$ and $2.06 \times 10^5$ (N/mm$^2$) to prevent or reduce deflection due to its own weight. Elastic modulus of the wire of the present embodiment is $1.0 \times 10^5$ (N/mm$^2$). Since first and second wires 3 and 4 of the present invention do not need to be twisted and folded, there is no need to differentiate moment of inertia of area in the longitudinal and in the transverse directions. Therefore, first and second wires 3 and 4 are formed in a circular shape having the same strength and the same rigidity with respect to an external force from all directions. Thus, because first and second wires 3 and 4 have a circular cross-sectional shape, they are rotatably fitted in first and second recesses 9a and 9b which will be described later, so that first and second wires 3 and 4 can be used as a shaft of hinge mechanism 5. It is understood that even if first and second wires 3 and 4 have a smaller moment of inertia of area and a smaller section modulus than conventional wires as described in Patent Documents 3, 4, first and second wires 3 and 4 can maintain strength and rigid feeling of the product. The diameter of the wire is preferably between 3.0 mm and 4.0 mm. Namely, if the diameter of the wire is smaller than 3.0 mm, the wire does not feel very rigid. If the diameter of the wire is larger than 4.0 mm, its mass is too large. The moment of inertia of area of the wire is between 3.98 mm$^4$ and 12.57 mm$^4$, and its section modulus is between 2.65 mm$^3$ and 6.28 mm$^3$. Specifically, the wire used in this embodiment has a diameter of 3.5 mm, a moment of inertia of area of 7.4 mm$^4$, and a section modulus of 4.2 mm$^3$. Loop-shaped first and second wires 3 and 4 are formed by joining both ends of the wire to each other, after extruding the wire by the force of a motor or hydraulic and then bending the extruded wire to a desired shape by a jig.

In first wire 3 and second wire 4, crank-shaped portion 3a,4a which is two-step bent, is formed at the both ends of the sides which face each other and which are not in contact with edging portions 6, 7. In sheet member 2, cutout portion 2d having a shape substantially along crank-shaped portion 3a,4a, is formed at a position facing crank-shaped portion 3a, 4a. Crank-shaped portion 3a, 4a and cutout portion 2d are omitted in FIG. 2 for simplicity. Outside of sheet member 2 (lower side in FIG. 3), synthetic resin lower cover 8 which is a part of hinge mechanism 5, is disposed at the position facing crank-shaped portion 3a, 4a and cutout portion 2d. Lower cover 8 is, for example, an injection molded article of PA66+GF (material in which glass fibers are contained in polyamide 66). Synthetic resin clamp 9 is attached so as to straddle lower cover 8 disposed on first part 2a side and lower cover 8 disposed on second part 2b side.

Figure 4:
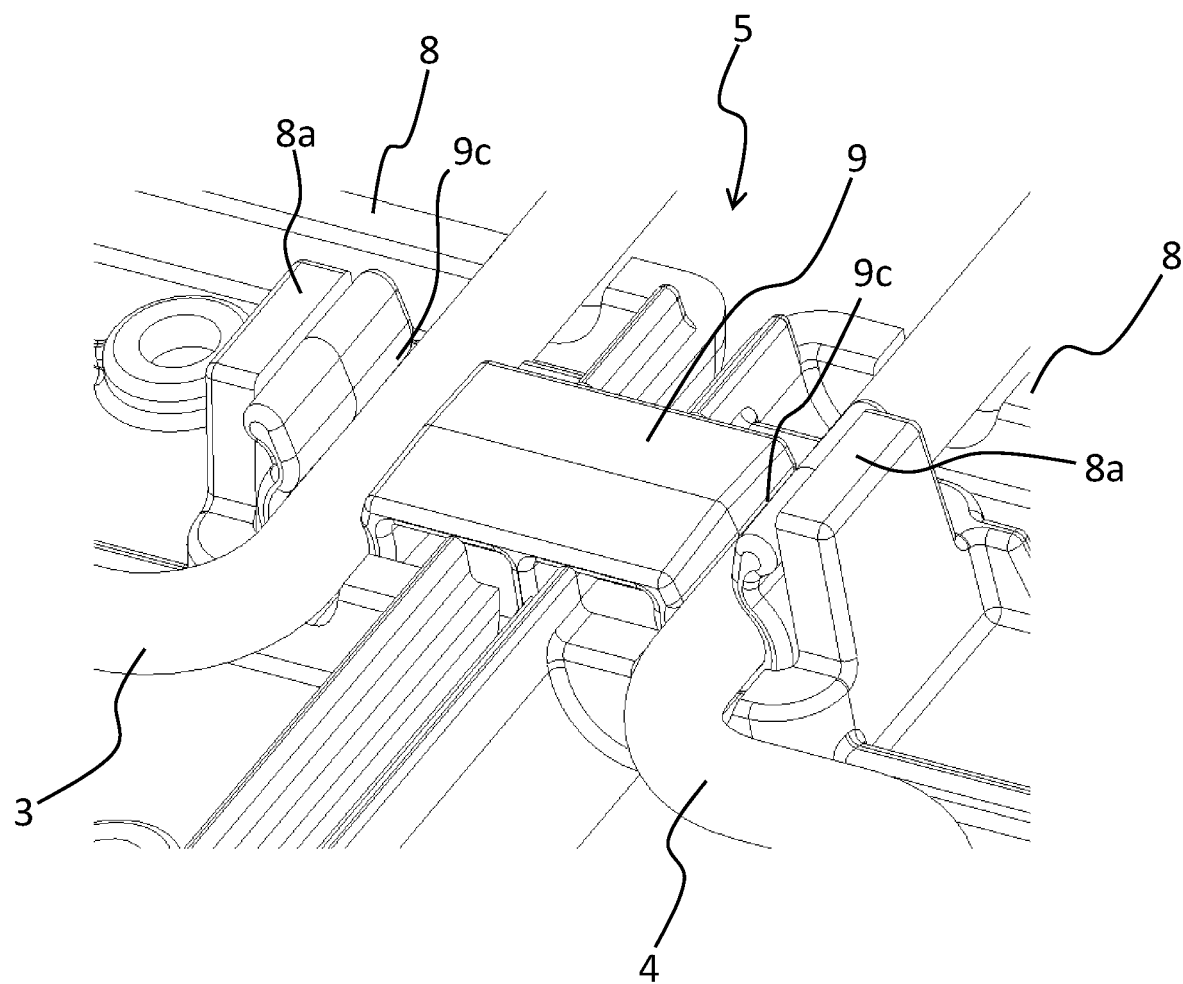
FIG. 4 is an enlarged perspective view showing a hinge mechanism of the tonneau cover shown in FIGS. 1A and 1B, in a state in which the upper cover is omitted.
Figure 5A:
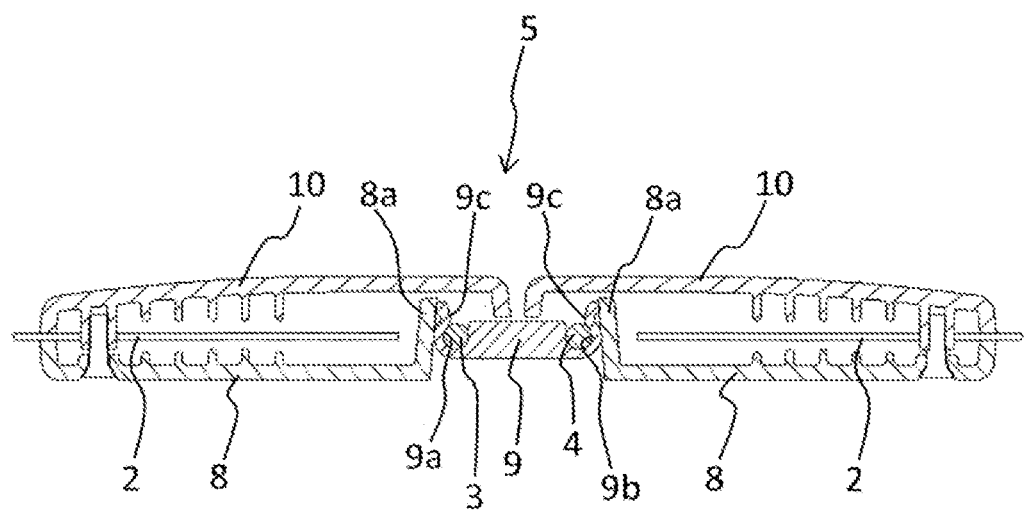
FIG. 5A is a cross-sectional view of the hinge mechanism of the tonneau cover shown in FIGS. 1A and 1B.
Figure 5B:
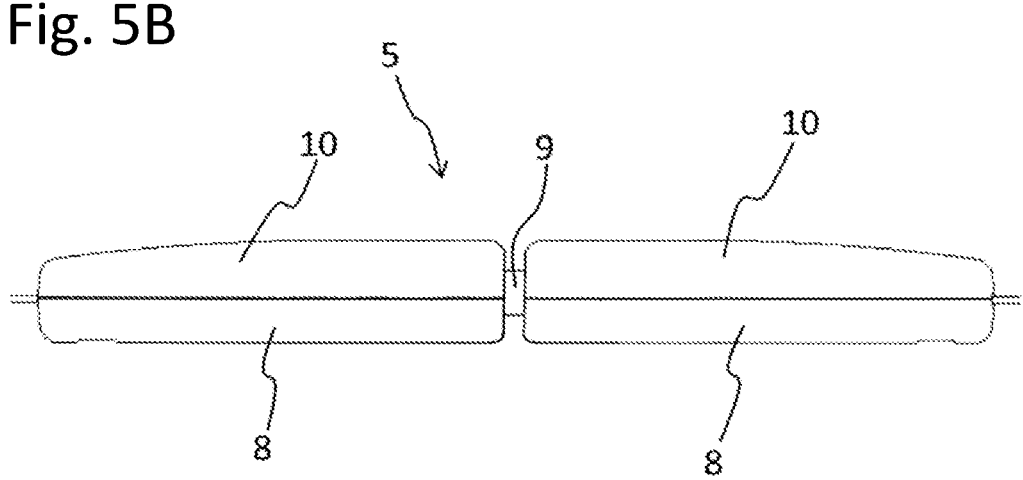
FIG. 5B is a front view of the hinge mechanism of the tonneau cover shown in FIGS. 1A and 1B.

As shown in FIGS. 4 and 5A, a part of first wire 3 which is exposed without being covered by edging portion 6, is rotatably fitted into first recess 9a of clamp 9 attached to lower cover 8. Similarly, a part of second wire 4 which is exposed without being covered by edging portion 7, is rotatably fitted into second recess 9b of clamp 9. Clamps 9 are located so as to straggle two lower covers 8 and maintain the interval from first wire 3 and the first part 2a to second wire 4 and second part 2b. Lower cover 8 and upper cover 10 that is made of synthetic resin (e.g., injection molded article of PA66+GF) which is a part of hinge mechanism 5, overlap a part of first and second wires 3, 4 with clamp 9 interposed therebetween.

Specifically, first and second wires 3 and 4 are placed on upper cover 10 in a state in which the position shown in FIG. 3 is turned upside down. First and second wires 3 and 4 placed on upper cover 10 are fitted into first and second recesses 9a and 9b of clamps 9. Then, lower cover 8 is overlapped on upper cover 10 with clamps 9 interposed therebetween. Upper cover 10 and lower cover 8 have substantially the same external shape and are fixed to each other by screws 11. Upper cover 10 and lower cover 8 are fixed to each other while accommodating a part of first and second wires 3 and 4 and clamps 9. Thus, hinge mechanisms 5 are formed. Then, although omitted in FIG. 3, another sheet member 2 overlaps sheet member 2 on which edging portions 6, 7 and first and second wires 3, 4 are placed, such that edging portions 6, 7 and first and second wires 3, 4 and hinge mechanisms 5 are sandwiched between two sheet members 2.

Because of such a structure, a set of one lower cover 8 and first wire 3 and a set of the other lower cover 8 and second wire 4 are connected to each other by clamps 9 and are relatively rotatable to each other. By relative rotation, a set of first wire 3 and first part 2a and a set of second wire 4 and second part 2b are openable and closable between a state in which they are opened to each other and connected to each other so as to extend horizontally continuously (see FIG. 1A) and a state in which a set of first wire 3 and first part 2a and a set of second wire 4 and second part 2b overlap each other and are closed (see FIG. 1B). Even when the set of first wire 3 and first part 2a and the set of second wire 4 and second part 2b are opened to each other or closed to each other, the set of first wire 3 and first part 2a and the set of second wire 4 and second part 2b remain in a connected state by clamps 9 without being separated. As shown in FIGS. 4 and 5A, openings 9c of first and second recesses 9a, 9b are at least partially narrower than the diameters of first and second wires 3 and 4. As a result, first wire 3 and second wire 4 fitted in first and second recesses 9a, 9b of clamps 9 do not leave from first and second recesses 9a, 9b. Further, lower cover 8 is provided with restraint portion 8a for preventing or reducing deformation of opening portions 9c of first and second recesses 9a,9b. Thereby, first wire 3 and second wire 4 are prevented from falling off from opening 9c due to elastic deformation to widen opening 9c of first and second recesses 9a,9b.

Handle portion 12 is attached to each of the outer end portions of first part 2a and second part 2b of sheet member 2, i.e., each of the end portions that are opposite to the portion where first part 2a and second part 2b face each other. Specifically, upper portion 12a and lower portion 12b, which are injection molded articles of a synthetic resin, for example, polyacetal (POM), overlap each other with sheet member 2 and pin 13 sandwiched therebetween and are fixed to each other by screws 11. Handle portion 12 constructed in this manner, is used as a portion where the user holds when attaching or removing tonneau cover 1 to/from the luggage compartment or when folding tonneau cover 1. As a result, it is easy to manage tonneau cover 1. Suspension strings 14 made of a resin fiber (e.g., eight strand plaited cord of 6 nylon (registered trademark) textured yarn) are attached to an outer end portions of first part 2a and second part 2b of sheet member 2. Suspension string 14 is sewn to a part of tonneau cover 1, and is also attached to a part of the interior of the vehicle in which tonneau cover 1 is installed. The length and mounting position of suspension strings 14 are set such that when the back door of the vehicle is closed, tonneau cover 1 is held horizontally, and when the back door is opened, tonneau cover 1 is open to a sufficient degree to ensure that the user can easily access the inside the luggage compartment. Suspension string 14 is preferably attached to the right end or the left end of tonneau cover 1 so as not to obstruct the rear view of the driver.

First and second wires 3 and 4 of the present embodiment have crank-shaped portions 3a,4a. Most of first and second wires 3 and 4 are sandwiched between sheet members 2. However, in both end portions of the sides of first wire 3 and second wire 4 which face each other, there is an exposed portion of first and second wires 3 and 4 without being covered by sheet member 2, so as to fit into first and second recesses 9a, 9b of hinge mechanism 5. In tonneau cover 1 of the comparative example shown in FIG. 6, in the vicinity of the portion of first and second wires 3 and 4 having no crank-shaped portion which is exposed without being covered by sheet member 2, sheet member 2 may move in the direction indicated by the arrow such that crumple may occur. In contrast, in the present embodiment, crank-shaped portions 3a, 4a are provided at the position close to the portion of first and second wires 3 and 4 to be fitted into first and second recesses 9a,9b of hinge mechanism 5, as shown in FIG. 7. Upper and lower sheet members 2 are fixed (stitched) to each other by a part of the bent portion of crank-shaped portions 3a, 4a, so that stitched portion 2e is held by crank-shaped portions 3a, 4a. If sheet member 2 is likely to move in the arrow direction in FIG. 6, stitched portion 2e held by crank-shaped portions 3a, 4a prevents the sheet member from moving in the arrow direction. As a result, the occurrence of crumple in sheet member 2 can be prevented or reduced. After stitched portion 2e is formed and held by crank-shaped portions 3a, 4a, hinge mechanism 5 is attached.

Figure 6:
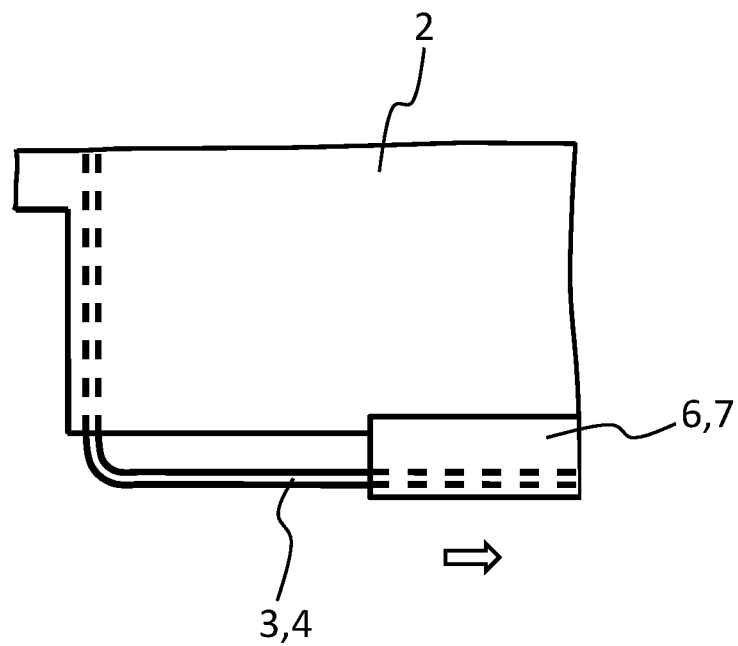
FIG. 6 is an enlarged plan view of a main part of a tonneau cover of a comparative example.
Figure 7:
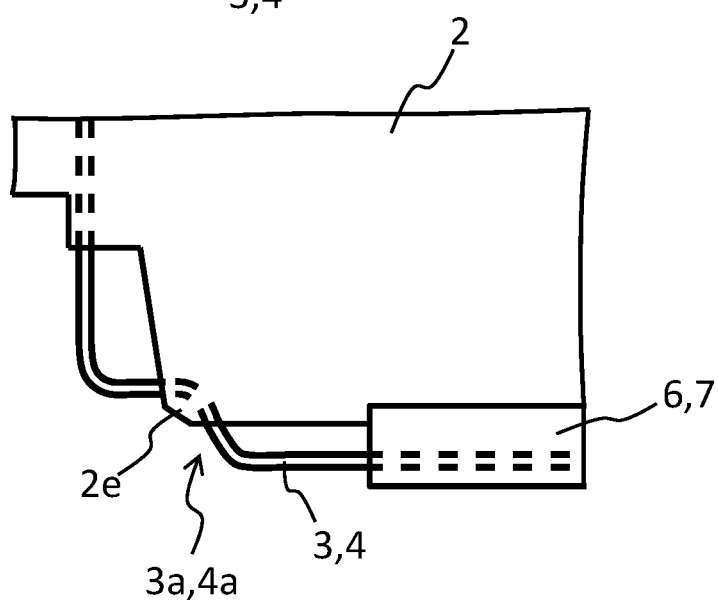
FIG. 7 is an enlarged plan view of a main portion of the tonneau cover shown in FIGS. 1A and 1B.

In the comparative example shown in FIG. 6, it is difficult to provide an exposed portion of first and second wires 3 and 4 with a portion for locking sheet member 2. However, in the embodiment shown in FIG. 7, since crank-shaped portions 3a, 4a including the bent portion are provided on first and second wires 3 and 4, stitched portion 2e of sheet member 2 can be easily held by crank-shaped portions 3a, 4a. Thereby, the movement of sheet member 2 can be prevented or reduced both in the arrow direction and in the direction orthogonal to the arrow.

Thus, tonneau cover 1 of the present invention can be easily folded in two. In addition, tonneau cover 1 has excellent durability and design properties. In particular, when crank-shaped portions 3a, 4a are provided on first and second wires 3 and 4, the occurrence of crumple in sheet member 2 is prevented or reduced.

What is claimed is:
1. A shielding member comprising:
 a generally rectangular and flexible sheet member including a first part and a second part;
 a first wire surrounding at least a portion of the first part; and a second wire surrounding at least a portion of the second part, wherein
- the shielding member is foldable in two about a portion between the first wire and the second wire such that the first part with the first wire and the second part with the second wire overlap each other,
- a hinge mechanism provided at a portion between the first wire and the second wire, the hinge mechanism being connected to the first wire and the second wire, respectively, so as to hold the first wire and the second wire such that the first wire and the second wire are rotatable to each other, and
- the hinge mechanism has a first recess into which a part of the first wire fits, a second recess into which a part of the second wire fits, and a restraint portion which regulates deformation of the first recess and the second recess in a direction in which an opening of the first and second recesses widens.

2. The shielding member according to claim 1, wherein the sheet member is provided continuously over the first part and the second part so as to collectively cover a portion defined by the first wire, a portion defined by the second wire, and a portion between the first wire and the second wire.

3. The shielding member according to claim 1, wherein the first wire and the second wire are each provided with a crank-shaped portion for holding the sheet member.

\* \* \* \* \*